M. C. WEST.
Platform-Spring.
No. 199,336. Patented Jan. 15, 1878.
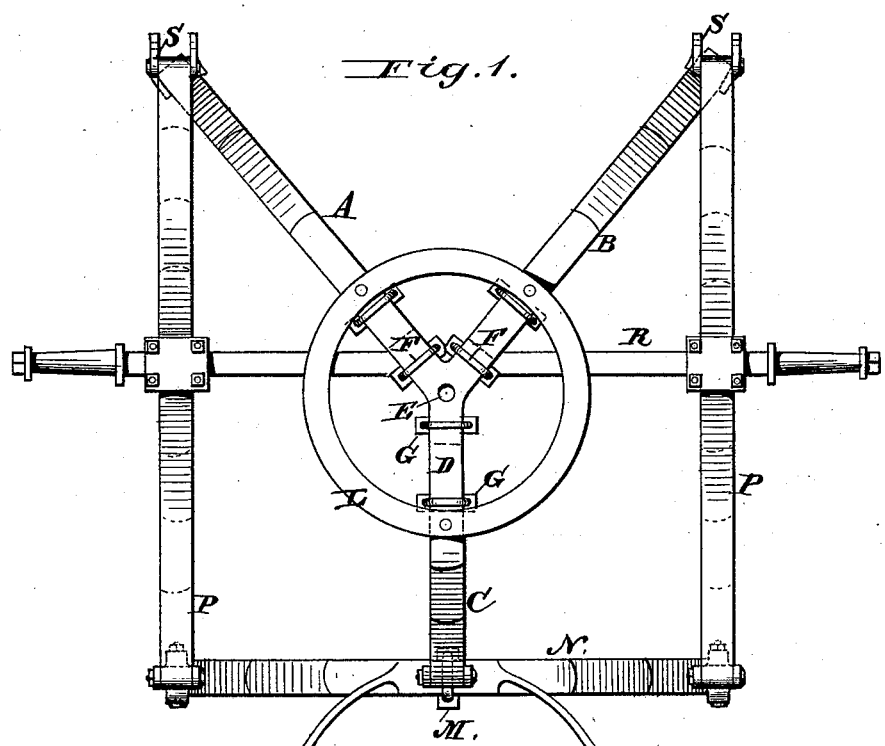
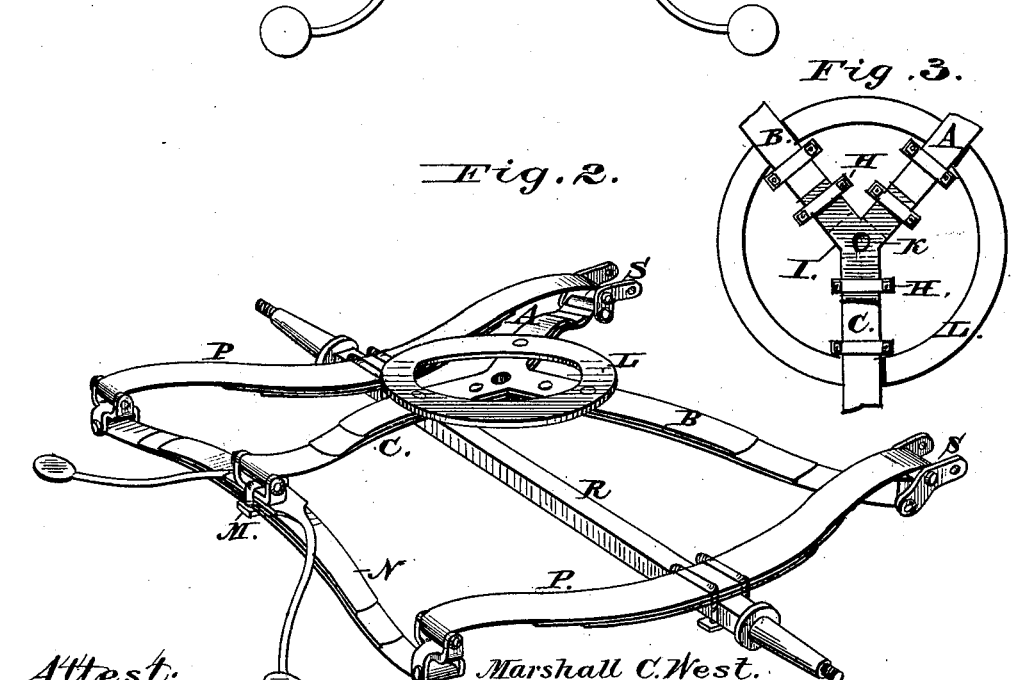
Attest:
H. L. Perrine
Chas. L. Coombs.
Marshall C. West.
Inventor:
By James L. Norris. Atty.

UNITED STATES PATENT OFFICE.

MARSHALL C. WEST, OF SPENCER, ASSIGNOR OF ONE-HALF HIS RIGHT TO FRANK FERRIS, OF OSWEGO, NEW YORK.

IMPROVEMENT IN PLATFORM-SPRINGS.

Specification forming part of Letters Patent No. 199,336, dated January 15, 1878; application filed November 10, 1877.

*To all whom it may concern:*

Be it known that I, MARSHALL CYRENUS WEST, of Spencer, in the county of Tioga and State of New York, have invented certain new and useful Improvements in Platform-Gear for Vehicles, of which the following is a specification:

This invention relates to certain improvements in platform-gear for wagons, carriages, and other wheeled vehicles; and the invention consists in a spring-frame composed of three springs, radiating or branching from a similarly-branching frame, to which they are connected, and through which the king-bolt passes, one of said branching springs being connected with the cross-spring and the other two to the front of the side springs, which are supported by the front axle, the whole forming a support for the lower fifth-wheel section of the vehicle, which is secured to the branching frame, as more fully hereinafter described.

In the drawings, Figure 1 represents a top view of my invention; Fig. 2, a perspective view; and Fig. 3, a detached bottom view, showing the lower plate for securing the springs.

The letters A B C represent the three springs, made of sheet-steel or other elastic metal, in one or more leaves, as may be desired. The letter D represents a frame or platform, having three branching arms, in the center of which is formed the aperture E for the king-bolt. The springs A B C are secured to the respective arms of the frame or platform D by means of bent straps F, screw-threaded at their ends, which embrace the arms of the frame or platform D, and confine the springs to said arms by means of the cross-pieces G, passing under said springs, and secured to the straps by screw-nuts H.

The letter I represents a plate with short branching arms, secured below the springs by means of the straps and cross-pieces, for the purpose of better confining the said springs together and securing them to the platform, said plate having an aperture, K, directly in line with the aperture in the frame or platform D, for the passage of the king-bolt. The letter L represents the lower fifth-wheel section, which is bolted to the arms of the platform or frame D.

The spring C, which extends rearwardly when the platform is in position, is secured to a clip, M, attached to the cross-spring N, the ends of which are secured to the rear ends of the side spring P. Said side springs are secured to the axle R in any convenient manner, and to the forward ends of said springs the ends of the branching springs A B are secured by means of clips S. The said clips S are peculiarly constructed of malleable cast-iron, and serve as points of attachment for the shafts of the vehicle, as well as for securing the ends of the springs.

By means of the branching springs much greater elasticity is imparted to the platform-gear, while at the same time greater strength is secured, and the weight of the whole is materially lessened.

The lower plate and straps F may be dispensed with, and the frame or plate D formed with longitudinal grooves, into which the ends of the springs A B C may be slipped and secured.

I claim and desire to secure by Letters Patent—

1. In a platform-gear for vehicles, the combination of the frame or platform D, consisting of three branching arms, the three branching springs A B C, attached to the arms of the platform, and the cross-spring N, attached to the single spring C and to the ends of the side springs P, which are attached at their other ends to the springs A B, the whole being constructed and arranged substantially as and for the purpose described.

2. The combination of three branching springs, the frame D, and the plate I, and the straps and cross-pieces for securing the whole together, substantially as specified.

In testimony that I claim the foregoing I have hereunto set my hand and seal in the presence of the subscribing witnesses.

MARSHALL CYRENUS WEST. [L. S.]

Witnesses:
GEO. BROOKS,
S. J. SHEPARD.